United States Patent [19]

Young

[11] 4,237,594

[45] Dec. 9, 1980

[54] COIL SPRING COMPRESSING TOOL

[76] Inventor: John O. Young, 8448 W. 83rd St., Justice, Ill. 60458

[21] Appl. No.: 7,505

[22] Filed: Jan. 29, 1979

[51] Int. Cl.³ .............................................. B23P 19/04
[52] U.S. Cl. ..................................... 29/227; 254/10.5
[58] Field of Search ........................... 29/227; 254/10.5

[56] References Cited

U.S. PATENT DOCUMENTS

| | | | |
|---|---|---|---|
| 2,721,376 | 10/1955 | Showman | 29/227 |
| 3,051,443 | 8/1962 | Castoe | 29/227 |
| 3,067,500 | 12/1962 | Bliss | 29/227 |
| 3,341,175 | 9/1967 | Branick | 29/227 |

*Primary Examiner*—James L. Jones, Jr.
*Attorney, Agent, or Firm*—Laff, Whitesel & Rockman

[57] ABSTRACT

A spring compressing tool is provided to efficiently compress a coil spring on the suspension system of an automobile. An elongated threaded rod includes a head disposed on one end adapted to be engaged by a common wrench or similar tool whereby the rod may be rotated. A plate having a central aperture to receive the threaded rod and to hold it in position while the spring is compressed is adapted to be removably mounted on the spring tower of the suspension system. A hook assembly to engage the coil spring is designed to receive the threaded rod and travel on the rod as the rod is rotated, thereby compressing the coil spring.

3 Claims, 6 Drawing Figures

COIL SPRING COMPRESSING TOOL

BACKGROUND OF THE INVENTION

This invention relates to a tool for compressing coil springs and more particularly, to a tool for compressing coil springs on automobile and truck suspension systems. The shock absorber is removed before the tool can be used or installed on the coil spring; this tool is for front coil springs on small and midsize Ford and Mercury cars.

To replace or repair the upper control arm on the front suspension system of an automobile, it is necessary to either remove the coil spring mounted on the control arm or compress the spring so that it does not bear on the control arm. Removing the coil spring is a time consuming and tedious process. Further, conventional tools for compressing coil springs are not designed for efficient operation inside the spring tower in which the shock spring is located and therefore, are difficult to operate, hindering removal of the upper control arm. Thus, there is a need for a simple tool that can efficiently compress a coil spring located in a spring tower on the suspension system of an automobile to allow removal of the upper control arm assembly without removing the coil spring from the automobile.

Accordingly, a primary object of the present invention is to provide a new and improved tool to compress a coil spring located in a spring tower on the front suspension system of an automobile.

Another object of my invention is to provide a spring compressing tool adapted to operate efficiently inside the spring tower on the front suspension system of an automobile.

A further object of my invention is to provide a spring compressing tool that can be removably mounted to a spring tower on the front suspension system of an automobile to facilitate compression of the spring located within the spring tower.

Yet another object of my invention is to provide a spring compressing tool that can be operated with a common wrench.

Still a further object of my invention is to provide a spring compressing tool that is simple in construction and easy to manufacture.

In the preferred embodiment of my invention, an elongated threaded rod is provided with a head disposed on one end which is adapted to be engaged by a common wrench or similar tool, whereby the rod may be rotated. A plate having a central aperture to receive the threaded rod and a plurality of smaller apertures spaced around its periphery to receive the bolts which secure the shock mount tower to the spring tower is adapted to be removably mounted on the spring tower. A hook assembly to engage the coil spring is designed to receive the threaded rod and travel on the rod as the rod is rotated. After the plate is mounted on the spring tower the threaded rod is inserted through the central aperture of the plate and the hook assembly is threaded on to the lower end of the rod, engaging the coil spring. Rotation of the rod in a clockwise direction will cause the hook assembly to travel up the rod, thereby compressing the coil spring.

DETAILED DESCRIPTION OF THE INVENTION

Figure 1:
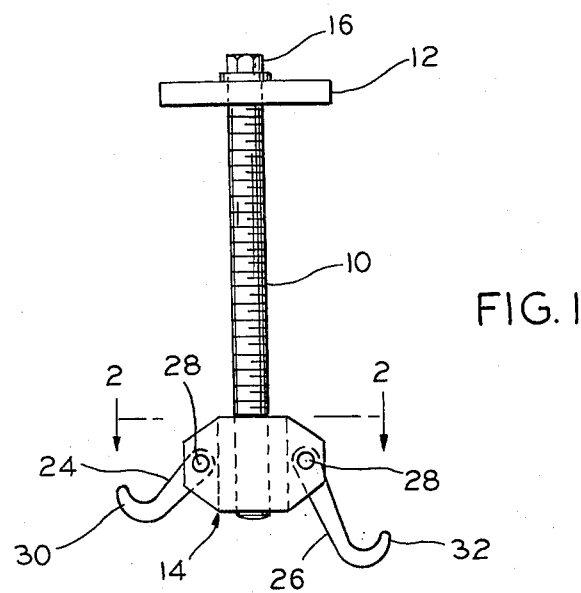
FIG. 1 is a side elevational view of the disclosed invention.

As shown in FIG. 1, a spring compressing tool constructed in accordance with my invention comprises elongated threaded rod 10, adapter or mounting plate 12 and hook assembly 14. Bolt 16 is securely affixed to the upper end of threaded rod 10 and is shaped to engage a common wrench or similar tool for rotating threaded rod 10.

Figure 2:
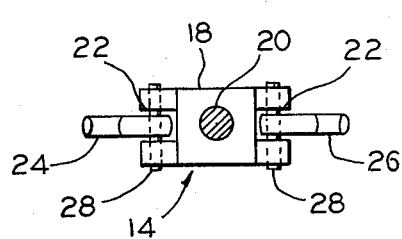
FIG. 2 is a top plan view of the hook assembly body member forming part of the disclosed invention taken along line 2—2 in FIG. 1.

In the preferred embodiment, as shown in FIG. 2, hook assembly 14 comprises member 18 having internally threaded aperture 20 adapted to receive threaded rod 10. Slots 22 are located on opposite sides of member 18 and are shaped to receive arms 24 and 26, which are pivotally mounted in slots 22 by means of pins 28. Hooks 30 and 32 (FIG. 1) are disposed at the outer extremities of arms 24 and 26, respectively, to engage the convolutions of a coil spring 54. Arm 24 is shorter than arm 26 so that it will engage coil spring 54 closer to member 18 than arm 26 engages coil spring 54, and thereby accommodate the configuration of coil spring 54.

Figure 3:
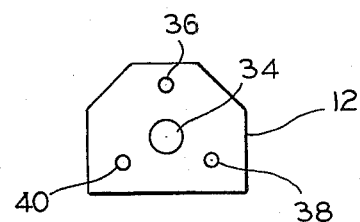
FIG. 3 is a top plan view of the mounting plate forming part of the disclosed invention.
Figure 5:
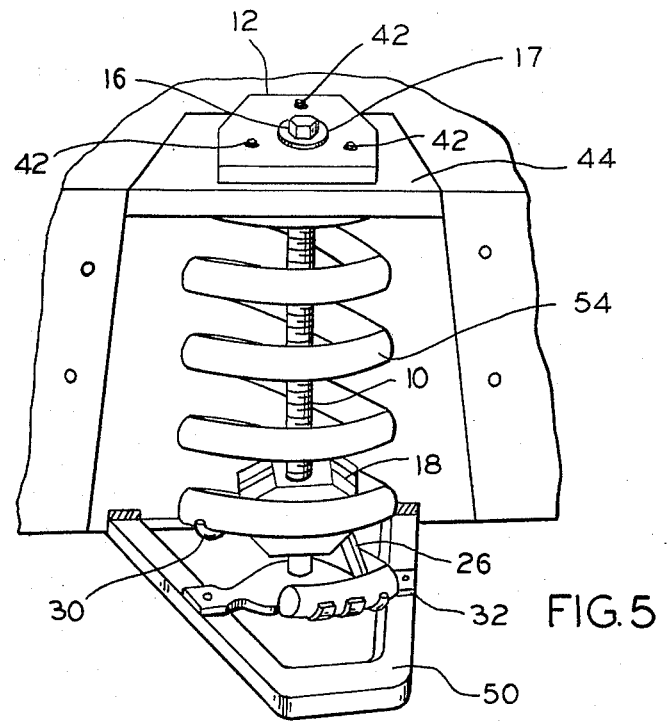
FIG. 5 is a perspective view of the disclosed invention mounted in the spring tower on the front suspension of an automobile.
Figure 6:
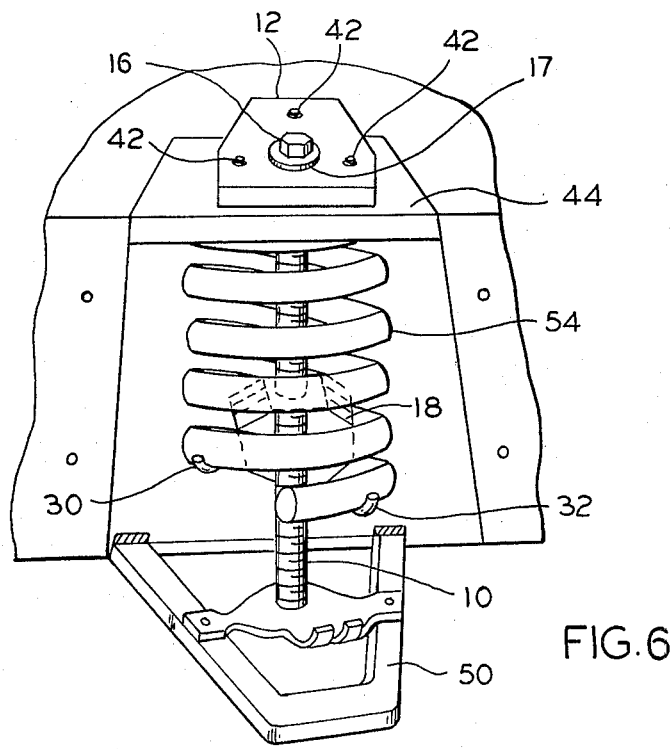
FIG. 6 is a perspective view of the disclosed invention mounted in the spring tower on the front suspension of an automobile and compressing a coil spring.

Mounting plate 12 (FIG. 3) includes centrally located aperture 34 through which threaded bolt 10 passes, and smaller apertures 36, 38 and 40 positioned around the periphery of plate 12. Apertures 36, 38 and 40 are specifically located in plate 12 to receive bolts 42 located on top of spring tower 44, which secure the shock mount tower 46 (FIGS. 5,6).

Figure 4:
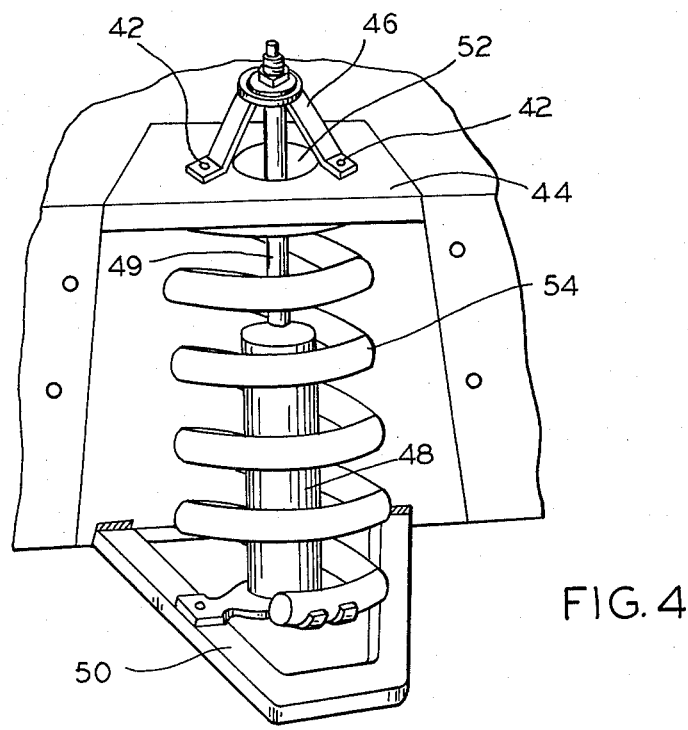
FIG. 4 is a side perspective view of a portion of the front suspension system of an automobile.

FIG. 4 illustrates a conventional upper control arm assembly as commonly found on the front suspension system of many automobiles, consisting of a shock absorber 48 mounted to a control arm 50. The piston 49 of shock absorber 48 extends through aperture 52 in spring tower 44 and is secured to spring tower 44 (which forms part of the frame of the automobile) by means of a shock mount assembly 46. Assembly 46 is secured to tower 44 by means of bolts 42 extending upward from the tower.

To use my invention, shock absorber 48 is first detached from control arm 50. Bolts 42 securing shock mount assembly 46 to spring tower 44 are unscrewed and shock absorber 48 and shock mount assembly 46 are removed from spring tower 44.

Mounting plate 12 is then secured to spring tower 44 by aligning apertures 36, 38 and 40 with bolts 42, and aperture 36 with aperture 52 of spring tower 44. Bolts 42 align aperture 34 with aperture 36 and prevent plate 12 from shifting laterally during compression of coil spring 54, thereby facilitating compression of the spring. Threaded rod 10 is inserted through apertures 36 and 52 with bolt 16 resting adjacent plate 12. Bolt 16 includes a flange 17 which is wider than aperture 34 in plate 12, and supports bolt 16 against plate 12 when my device is used to compress spring 54. Threaded rod 10 thereby extends axially through the convolutions of coil spring 54.

Hook assembly 14 is next threaded onto the lower end of rod 10 beneath coil spring 54, with hooks 30 and 32 engaging coil spring 54 as shown in FIGS. 5 and 6. Bolt 16 is then rotated with a wrench or other similar tool, drawing hook assembly 14 upward on rod 10 toward bolt 16, thereby compressing coil spring 54, as shown in FIG. 6. Control arm 50 can then be removed for repair or replacement.

Adapter plate 12 is prevented from moving from side to side because of the location of holes 36, 38 and 40. Also, the diameter of aperture 34 is not much larger than the diameter of rod 10, thereby allowing rod 10 to rotate relative to plate 12, but not allowing any appreciable lateral movement of rod 10.

Upon reinstallation of control arm 50, threaded rod 10 is rotated in the opposite direction lowering hook assembly 14 and thus, allowing coil spring 54 to expand. Coil spring 54 is reattached to control arm 50, hook assembly 14 and rod 10 are removed, and shock absorber 48 and shock mount tower 46 are installed.

While the principles of my invention have been described above in connection with specific embodiments and applications, it is to be understood that this description is made only by way of example and not as a limitation on the scope of the appended claims.

I claim:

1. A device for compressing a coil spring located in the spring tower on the suspension system of an automobile comprising;

an elongated threaded rod; rotating means disposed on one end of said rod adapted to be engaged by a tool whereby said rod may be rotated; shock mount assembly means removably attached to said spring tower by a plurality of bolts which remain on said spring tower when said assembly means is removed therefrom; adapter plate means adapted to be removably mounted on said spring tower of the suspension system of an automobile, said plate means having a centrally located aperture means shaped to receive said rod in a rotatable fit and to limit axial and lateral movement of said rod, and having a plurality of apertures spaced around the periphery of said plate means to fit over said bolts when said shock mount assembly is removed from said spring tower, whereby said adapter plate means is prevented from shifting laterally during compression of said coil spring; and hook assembly means adapted to engage the convolutions of a coil spring, said hook assembly means having a threaded aperture means adapted to receive said threaded rod, whereby when said hook assembly means is mounted on said rod opposite said rotating means and said rod is rotated, said hook assembly means moves upward on said rod engaging the convolutions of said coil spring to compress said coil spring and said rotating means bears against said adapter plate means.

2. The coil spring compressing device of claim 1 wherein said hook assembly means comprises a body member having a centrally located threaded aperture adapted to receive said threaded rod, and a pair of slot means located on opposite sides of said body member means; a pair of arm means pivotally mounted in said slot means; and hook means disposed on the outer extremities of said arm means adapted to engage the convolutions of said coil spring.

3. The coil spring compressing device of claim 2 wherein one of said arm means is longer than the other of said arm means whereby said arms means engage said coil spring at different distances from said body member to accommodate the configuration of said spring.

* * * * *